United States Patent Office 3,075,994
Patented Jan. 29, 1963

3,075,994
NOVEL MONOSULFOHALIDES AND A PROCESS FOR THEIR PRODUCTION
Johann Heinrich Helberger, Munich-Thalkirchen, and Horst Baumann, Dusseldorf, Germany, assignors to Bohme Fettchemie G.m.b.H., Dusseldorf, Germany, a corporation of Germany
No Drawing. Filed Sept. 1, 1960, Ser. No. 53,340
Claims priority, application Germany Sept. 17, 1959
7 Claims. (Cl. 260—327)

This invention relates to novel monosulfochlorides and more particularly to α,ω-lower alkane sultone-β-sulfochlorides of the formula

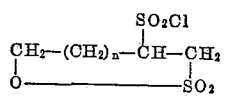

where $n$ is an integer from 0 to 1 and the chloro-lower alkene-sulfochlorides of the formula

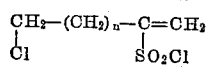

and

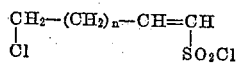

where $n$ is an integer from 0 to 1, and to the process for their preparation.

From the literature it is known that 1-hydroxy-propane-3-sulfonic acid in the form of its salts reacts with phosphorus pentachloride to form 1-chloropropane-3-sulfochloride (see, for example, M. S. Kharasch, E. M. May and F. R. Mayo, Journal of Organic Chemistry, vol. 3, page 175 (1939)). It would be expected that an ω-hydroxy-lower alkane-α,β-disulfonic acid would react similarly to form an ω-chloro-lower alkane-α,β-disulfochloride.

It is an object of the present invention to obtain novel monosulfohalides selected from the group consisting of

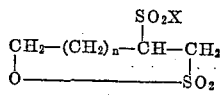

and a mixture of

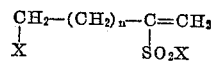

and

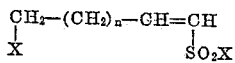

where $n$ is an integer from 0 to 1 and X represents a halogen atom.

It is a further object to obtain 1,3-propane-sultone-2-sulfochloride and a mixture of 1-chloro-2-propene sulfochloride isomers with the sulfochloride group in either the 2- or 3-position.

It is a still further object of this invention to develop a process for the preparation of novel monosulfohalides selected from the group consisting of

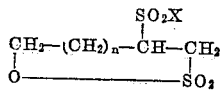

and a mixture of

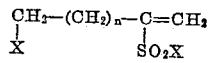

and

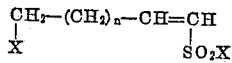

where $n$ is an integer 0 to 1 and X represents a halogen atom.

These and other objects of the invention will become more apparent as the description thereof proceeds.

We have found that by reacting phosphorus pentachloride with ω-hydroxy-lower alkane-α,β-disulfonic acid or its salts and especially with 1-hydroxypropane-2,3-disulfonic acid or its salts it is possible to obtain novel monosulfochlorides which, because of their particular structure, possess valuable reaction properties which are suitable for the performance of many types of chemical reactions. The process in accordance with the invention is carried out by intimately admixing the disulfonic acid in the form of its salt, for example in the form of its potassium salt which crystalizes without water of crystallization, with a halogenating agent such as phosphorus pentachloride, although other halogenating agents such as phosphorus pentabromide may be used, and heating the resulting mixture for several hours on a water bath. Mixtures are formed thereby which contain mainly monosulfohalides of the following composition:

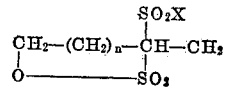

and a mixture of

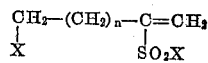

and

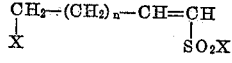

where $n$ is an integer from 0 to 1 and X represents a halogen atom.

In the case of 1-hydroxy-propane-2,3-disulfonic acid and phosphorus pentachloride, the formation of 1-chloro-propane-2,3-disulfochloride would have been expected. The actual course of reaction, which instead leads to the below indicated monosulfochlorides, was surprising and novel. More particularly, the formation of a sultone ring and thus the formation of a compound which contains two functionally different groups could not in any way have been foreseen. When 1-hydroxy-propane-2,3-disulfonic acid in the form of its salts and especially the potassium salt is reacted with phosphorus pentachloride, the reaction mixture contains mainly monosulfochlorides of the following composition:

1,3-propane-sultone-2-sulfochloride of the formula

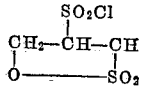

and 1-chloro-2-propene-sulfochloride of the formula

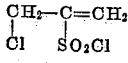

or

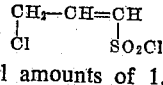

in addition to small amounts of 1,2-dichloropropane-3- or 1,3-dichloropropane-2-sulfochloride. The above identified sulfochlorides may be isolated from these mixtures.

1,3-propane-sultone-2-sulfochloride is a solid crystalline substance and 1-chloro-2-propene-sulfochloride is an oily liquid. Both compounds are marked by a high reactivity and make it possible to perform stepwise reactions of many types due to their bifunctional properties. The configuration of the 1-chloro-2-propene-sulfochloride is not known. The product obtained can be either the 2- or the 3-substituted sulfochloride and may be a mixture of both.

Products of this type were unknown and they make it possible to perform reactions which could heretofore not be performed. Aside from the fact that these products make it possible to perform stepwise reactions with organic compounds which contain exchangeable hydrogen atoms attached either to carbon atoms or also through oxygen, sulfur or nitrogen atoms, they may be used for treating natural or synthetic products to achieve particular finishing properties, for example, for increasing the hydrophilic properties.

The present process is not limited to the use of 1-hydroxy-propane-disulfonic acid-2,3 or its salts as starting materials, but other ω-hydroxy-lower alkane-α,β-disulfonic acids may also be used. Furthermore such hydroxy alkane disulfonic acids may be used as a parent material which correspond to the formula

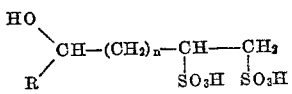

in which the OH group is not in ω-position, R stands for an hydrocarbon radical, particularly a substituent selected from the group consisting of hydrogen and alkyl of one to two carbon atoms, preferably an aliphatic radical, and $n$ means 0 to 1. In such a way sulfohalides of the following formulas may be obtained

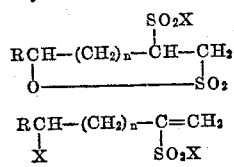

and

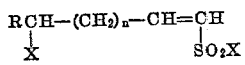

in which R, X and $n$ have the above noted signification.

In place of phosphorus pentachloride, other halogenating agents may be used, such as phosphorus pentabromide. In such case the process is performed in the like manner as by means of phosphorus pentachloride and the analogous sulfobromides are formed.

The following specific examples of the process of the invention are illustrative only and are not deemed limitative.

Example Ia 74 parts by weight of dry, finely powdered potassium 1-hydroxy-propane-2,3-disulfonate were intimately admixed with 170 parts by weight of phosphorus pentachloride and the mixture was heated under reflux at 90 to 110° C. The reaction started gradually; the reaction mixture liquefied and hydrogen chloride was given off. After 4 to 6 hours the reaction had gone to completion, which was recognized by the fact that a liquid was formed which contained only very few solid components (potassium chloride) and had virtually no color and by the fact that practically no more hydrogen chloride was given off. For separation of the reaction product, the phosphorus-oxychloride formed by the reaction was distilled off, advantageously under reduced pressure. The distillation residue was taken up in 50 to 100 parts by volume of carbon tetrachloride and the mixture was admixed with ice water, accompanied by stirring, so that the temperature did not exceed 10° C. This step brought about the hydrolysis of small amounts of phosphorus chloride which may still have been present and dissolution of the potassium chloride. At the same time, a white, finely crystalline product was obtained which was insoluble in water as well as in carbon tetrachloride. The product was freed from liquid sulfochlorides by vacuum filtration and washing with carbon tetrachloride. The product was 1,3-propane-sultone-2-sulfochloride and was obtained with a yield of 20 parts by weight, corresponding to 36% of theory, in a relatively pure state.

By recrystallization from carbon tetrachloride the sultone may be obtained in very pure form. It occurs as long, white, felted crystalline needles having a melting point of 109 to 111° C. Its solubility in customary organic solvents is very low, especially in the cold. It is relatively stable in cold water, but hydrolyzes rapidly upon being heated, whereby the sultone ring is split first and the sulfochloride group is saponified in a second reaction step.

Analysis of the product $C_3H_5O_5S_2Cl$ resulted in the following values.

Calculated: C, 16.33%; H, 2.27%; S, 29.07%; Cl 16.10%. Found: C, 16.03%; H, 2.42%; S, 29.18%; Cl, 16.27%.

Example Ib

The carbon tetrachloride solution which remained behind after separation of the 1,3-propane-sultone-2-sulfochloride in the procedure described in Example Ia and which had a yellowish color and a pungent odor was dried over sodium sulfate, freed from solvent by distillation under reduced pressure and then distilled at 12 mm. of Hg. Two fractions were obtained, the first passing over between 85 to 90° C. at 12 mm. of Hg and the second between 115 to 120° C. at 12 mm. of Hg. The fraction with the lower boiling point was chloropropene-sulfochloride which was obtained with a yield of about 40% of theory. It is thermally relatively very stable and distills under atmospheric pressure at 180 to 183° C. without decomposition. The pure compound is colorless, had a pungent odor and is liquid which has lacrimating properties.

The analysis of the product $C_3H_4O_2SCl_2$ resulted in the following values.

Calculated: C, 20.57%; H, 2.28%; S, 18.32%; Cl, 40.52%. Found: C, 20.70%; H, 2.45%; S, 18.42%; Cl, 40.89%.

The fraction with the higher boiling point was identified as dichloropropane sulfochloride. It was thermally unstable and transformed into chloro-propene-sulfochloride and 1,2,3-trichloropropane upon distillation at atmospheric pressure.

Example II 52 parts by weight of dry, finely powdered sodium 1-hydroxypropane-2,3-disulfonate were intimately mixed with 250 parts by weight finely powdered phosphorus pentabromide. The mixture was heated under reflux at 90 to 110° C. The reaction started promptly, the mixture liquified and hydrogen bromide was given off. After 4 to 5 hours the reaction was finished. One obtains a brown fluid which solidified in the cold. The reaction mixture was diluted with 150 parts by volume of carbon tetrachloride and poured gradually into ice water while stirring and cooling. Thereby the sodium bromide is dissolved and the excess of phosphorus pentabromide as well as the formed phosphorus oxybromide is hydrolyzed. Simultaneously a brownish colored crystallized precipitate is formed being difficultly soluble in water and carbon tetrachloride. This precipitate was separated by filtration, washed with carbon tetrachloride and dried. One obtains the 1,3-propane-sultone-2-sulfobromide in a yield of 7 parts by weight corresponding to 25% of theory. The sultone was recrystallized from chloroform and was obtained as star-shaped crystallized needles having a melting point of 95° C. With regard to its properties it corresponds largely to the 1,3-propane-sultone-2-sulfochloride.

The remaining carbon tetrachloride solution is worked up as described in Example Ib. One obtains a fraction of bromo-propene-sulfobromides as a brownish colored oil having a pungent odor and boiling between 96 and 99° C. at 12 to 13 mm. of Hg. The oil was obtained with a yield of about 48% of theory.

Analogously to the reaction with phosphorus pentachloride in the reaction of the sodium 1-hydroxy-propane-2,3-disulfonate with phosphorus pentabromide a further higher boiling fraction of dibromopropanesulfobromides is obtained.

Example III

In analogous manner as described in the foregoing examples the potassium 3-hydroxy-pentane-1,2-disulfonate may be reacted with phosphorus pentachloride. The corresponding sulfochlorides such as

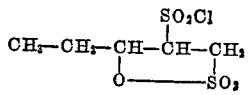

and a mixture of

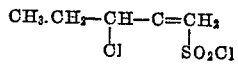

and

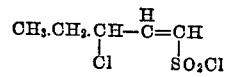

are obtained.

It is to be understood that the previous specific embodiments are preferred modes of practice of the invention, but that the invention is not limited thereto. Various changes and modifications may be made without departing from the spirit of the invention and the scope of the appended claims.

We claim:

1. 1,3-propane-sultone-2-sulfochloride having the formula

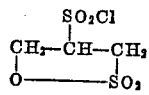

2. A process for the production of 1,3-propane-sultone-2-sulfochloride of the formula

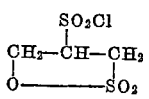

which comprises the steps of reacting potassium 1-hydroxy-propane-2,3-disulfonate with phosphorus pentachloride at reflux temperatures, removing the excess phosphorus pentachloride, and separating the solid 1,3-propane-sultone-2-sulfochloride.

3. 1,3-propane-sultone-2-sulfobromide having the formula

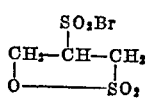

4. 1,3-pentane-sultone-2-sulfochloride having the formula

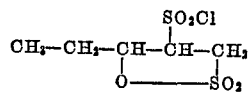

5. A process for the preparation of monosulfohalides selected from the group consisting of

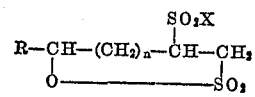

and a mixture of

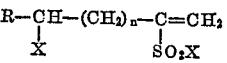

and

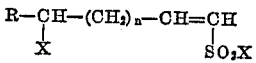

wherein R represents a substituent selected from the group consisting of hydrogen and alkyl of one to two carbon atoms, $n$ is an integer from 0 to 1 and X represents a halogen atom selected from the group consisting of chlorine and bromine, which comprises the step of reacting (a) a disulfonic acid salt of the formula

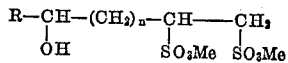

where R and $n$ have the above-assigned meanings and Me represents a salt-forming radical with (b) a phosphorus pentahalide selected from the group consisting of phosphorus pentachloride and phosphorus pentabromide at elevated temperatures and recovering said monosulfohalides.

6. A process for the production of a mixture of 1-chloro - 2 - propene-2-monosulfochloride and 1-chloro-2-propene-3-monosulfochloride which comprises the steps of reacting potassium 1 - hydroxy-propane - 2,3 - disulfonate with phosphorus pentachloride at reflux temperatures, removing the excess phosphorus pentachloride, separating the solid 1,3-propane-sultone-2-sulfochloride and recovering said mixture of 1-chloro-2-propene-monosulfochlorides from the liquid phase by distillation.

7. A sultone having the formula

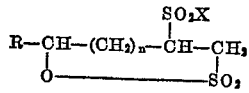

wherein R represents a substituent selected from the group consisting of hydrogen and alkyl of one to two carbon atoms, $n$ is an integer from 0 to 1 and X represents a halogen atom selected from the group consisting of chlorine and bromine.

References Cited in the file of this patent

Chemical Abstracts, volume 52, page 1091, Abstracting, Esayan et al., Izvest, Akad. Nauk Armyan S.S.S.R., Ser. Khim Nauk 10, No. 7, 71–4 (1957).